US009861958B2

(12) United States Patent
O'Keefe et al.

(10) Patent No.: US 9,861,958 B2
(45) Date of Patent: Jan. 9, 2018

(54) MULTIFUNCTIONAL CERIUM-BASED NANOMATERIALS AND METHODS FOR PRODUCING THE SAME

(71) Applicant: The Curators of the University of Missouri, Columbia, MO (US)

(72) Inventors: Matthew J. O'Keefe, Rolla, MO (US); Carlos E. Castano Londono, Rolla, MO (US); William G. Fahrenholtz, Rolla, MO (US)

(73) Assignee: The Curators of The University of Missouri, Columbia, MO (US)

( * ) Notice: Subject to any disclaimer, the term of this patent is extended or adjusted under 35 U.S.C. 154(b) by 804 days.

(21) Appl. No.: 14/307,031

(22) Filed: Jun. 17, 2014

(65) Prior Publication Data
US 2014/0371059 A1    Dec. 18, 2014

Related U.S. Application Data

(60) Provisional application No. 61/836,007, filed on Jun. 17, 2013.

(51) Int. Cl.
*B01J 23/10* (2006.01)
*B01J 37/02* (2006.01)
(Continued)

(52) U.S. Cl.
CPC ........... *B01J 23/10* (2013.01); *B01J 27/1804* (2013.01); *B01J 35/004* (2013.01);
(Continued)

(58) Field of Classification Search
CPC .... B01J 23/10; B01J 27/1804; B01J 35/0006; B01J 35/0013; B01J 35/002; B01J 35/0033; B01J 35/004; B01J 37/0217; B01J 37/0219; B01J 37/0225; B01J 37/0226; B01J 37/035; B01J 37/06; B01J 37/28;
(Continued)

(56) References Cited

U.S. PATENT DOCUMENTS 4,258,129 A    3/1981    Ikenoue et al.
7,507,480 B2   3/2009    Sugama
(Continued)

FOREIGN PATENT DOCUMENTS

WO    WO 94/24321 A1    10/1994
WO    WO 9424321 A1 *  10/1994    ................ B22F 3/23

OTHER PUBLICATIONS

Singh et al. ("A phosphate-dependent shift in redox state of cerium oxide nanoparticles and its effects on catalytic properties," Biomaterials (Oct. 2011) 32(28): 6745-6753.*
(Continued)

*Primary Examiner* — Alexander M Weddle
(74) *Attorney, Agent, or Firm* — Michael A. Collins; Billion & Armitage

(57) ABSTRACT

Embodiments relate to a cerium-containing nano-coating composition, the composition including an amorphous matrix including one or more of cerium oxide, cerium hydroxide, and cerium phosphate; and crystalline regions including one or more of crystalline cerium oxide, crystalline cerium hydroxide, and crystalline cerium phosphate. The diameter of each crystalline region is less than about 50 nanometers.

12 Claims, 12 Drawing Sheets

(51) Int. Cl.
  B01J 37/28  (2006.01)
  B01J 37/34  (2006.01)
  B01J 27/18  (2006.01)
  B01J 35/00  (2006.01)
  C25B 1/00  (2006.01)
  C23C 22/48  (2006.01)
  C23C 22/56  (2006.01)
  C23C 22/57  (2006.01)
  C23C 22/73  (2006.01)
  C23C 22/78  (2006.01)
  C23C 22/83  (2006.01)
  C22C 21/10  (2006.01)
  C22C 21/12  (2006.01)
  C22C 23/02  (2006.01)
  B01J 37/03  (2006.01)
  B01J 37/06  (2006.01)

(52) U.S. Cl.
  CPC ....... *B01J 37/0217* (2013.01); *B01J 37/0219* (2013.01); *B01J 37/0225* (2013.01); *B01J 37/28* (2013.01); *B01J 37/345* (2013.01); *C22C 21/10* (2013.01); *C22C 21/12* (2013.01); *C22C 23/02* (2013.01); *C23C 22/48* (2013.01); *C23C 22/56* (2013.01); *C23C 22/57* (2013.01); *C23C 22/73* (2013.01); *C23C 22/78* (2013.01); *C23C 22/83* (2013.01); *C25B 1/003* (2013.01); *B01J 35/002* (2013.01); *B01J 35/0006* (2013.01); *B01J 35/0013* (2013.01); *B01J 35/0033* (2013.01); *B01J 37/0226* (2013.01); *B01J 37/035* (2013.01); *B01J 37/06* (2013.01)

(58) Field of Classification Search
  CPC ........ B01J 37/345; C22C 21/10; C22C 21/12; C22C 23/02; C23C 22/48; C23C 22/56; C23C 22/57; C23C 22/73; C23C 22/78; C23C 22/83; C25B 1/003

USPC ....................................................... 502/304
See application file for complete search history.

(56) References Cited

U.S. PATENT DOCUMENTS

| | | | |
|---|---|---|---|
| 8,048,523 B2 | 11/2011 | Kambe et al. | |
| 2004/0265590 A1* | 12/2004 | Schichtel | ............... B82Y 30/00 428/403 |
| 2013/0001094 A1* | 1/2013 | Cable | .................... H01M 14/00 205/340 |

OTHER PUBLICATIONS

Samiee et al. ("Optical Properties of Ceria Nanoparticles," Proceedings of the 4th International Conference on Nanostructures (ICNS4) (Mar. 12-14, 2012) Kish Island, I.R. Iran; 1222-1224. Retrieved from the internet Feb. 25, 2015 <http://icns4.nanosharif.ir/proceedings/files/iuoceedings/APP220.pdf>.).*

Singh et al., "A phosphate-dependent shift in redox state of cerium oxide nanoparticles and its effects on catalytic properties," Biomaterials (Oct. 2011) 32(28): 6745-6753.

Samiee et al., "Optical Properties of Ceria Nanoparticles," Proceedings of the 4th International Conference on Nanostructures (ICNS4) (Mar. 12-14, 2012) Kish Island, I.R. Iran; 1222-1224. Retrieved from the internet Feb. 25, 2015 <http://icns4.nanosharif.ir/proceedings/files/proceedings/APP220.pdf>.

International Search Report (Form PCT/ISA/210) for corresponding International Application No. PCT/US2014/04238 dated Mar. 13, 2015.

Written Opinion (Form PCT/ISA/237) for corresponding International Application No. PCT/US2014/04238 dated Mar. 13, 2015.

* cited by examiner

MULTIFUNCTIONAL CERIUM-BASED NANOMATERIALS AND METHODS FOR PRODUCING THE SAME

GOVERNMENT GRANTS

This works was supported by the Department of Energy National Energy Technology Laboratory under award numbers DE-EE0005660.

BACKGROUND

Use of AZXX Mg alloys is widespread as they are ideal alternatives to Al alloys and steel due to their lightweight nature and the corresponding mechanical properties (e.g. specific stiffness, specific strength). Among the AZXX series, AZ31, AZ61 and AZ91 are the major commercial alloys. However, the high chemical reactivity and poor corrosion resistance of Mg alloys have limited their use. In general, increasing Al content in AZXX alloys leads to better corrosion resistance but decreases ductility due to the formation of the brittle $Mg_{17}Al_{12}$ intermetallic phase (β). In particular, AZ91 has been extensively investigated due to its higher yield and ultimate tensile strengths as well as better corrosion resistance than AZ31 and AZ61. In comparison, AZ31 can be used to form more complex shapes due to better ductility, but has high chemical reactivity associated with the low Al content of about 3 weight percent (wt. %).

Chemical conversion coatings (CCs) are widely used as the initial layer of a coating system for protection of Mg alloys. Cerium-based conversion coatings (CeCCs) are capable of providing excellent corrosion resistance for high strength Mg and Al alloys when proper processing parameters are used.

Bulk $CeO_2$ has a stable cubic structure (fluorite type, space group Fm3m) from room temperature to the melting point (about 2500° C.). $CeO_{2-x}$ has a cubic fluorite structure up to x≈0.2 but additional structures such as rhombohedral, monoclinic, and triclinic are possible at 0.2<x<0.3. The electronic structure of cerium gives its compounds unusual physical, chemical and electrochemical properties. Cerium exists in two oxidation states, Ce(III) when the 4f orbital is occupied with one electron ($4f^1$) and Ce(IV) when unoccupied($4f^0$).

Cerium based oxides, such as oxygen deficient $CeO_{2-x}$, are technologically important because the Ce(III)/Ce(IV) couple may undergo rapid reduction-oxidation (redox) cycles at particular environmental conditions. The reduction mechanism from Ce(IV) to Ce(III) species in cerium oxides is not known, but Ce(III) is favored in oxygen-deficient atmospheres at elevated temperatures (e.g., 200-1000° C.). Thus, a dramatic alteration of environmental conditions is often necessary to effect a Ce(IV)/Ce(III) redox cycle.

SUMMARY

Embodiments relate to a cerium-containing nano-coating composition, the composition including an amorphous matrix including one or more of cerium oxide, cerium hydroxide, and cerium phosphate; and crystalline regions including one or more of crystalline cerium oxide, crystalline cerium hydroxide, and crystalline cerium phosphate. The diameter of each crystalline region is less than about 50 nanometers.

Embodiments also relate to a method for producing a composition. The method includes immersing a metal substrate in a cerium-containing aqueous bath having depositing a cerium-containing conversion coating on the substrate, spontaneously depositing a nano-coating on the substrate. The nano-coating includes an amorphous matrix including one or more of cerium oxide, cerium hydroxide, and cerium phosphate; and crystalline regions including one or more of crystalline cerium oxide, and crystalline cerium hydroxide. The method also includes immersing the nano-coated substrate in a phosphate-containing solution sufficient to convert the deposited nano-coating to a phosphated nano-coating including: an amorphous matrix including one or more of cerium oxide, cerium hydroxide, and cerium phosphate. The crystalline regions include one or more of crystalline cerium oxide, crystalline cerium hydroxide, and crystalline cerium phosphate.

DETAILED DESCRIPTION

Figure 1:
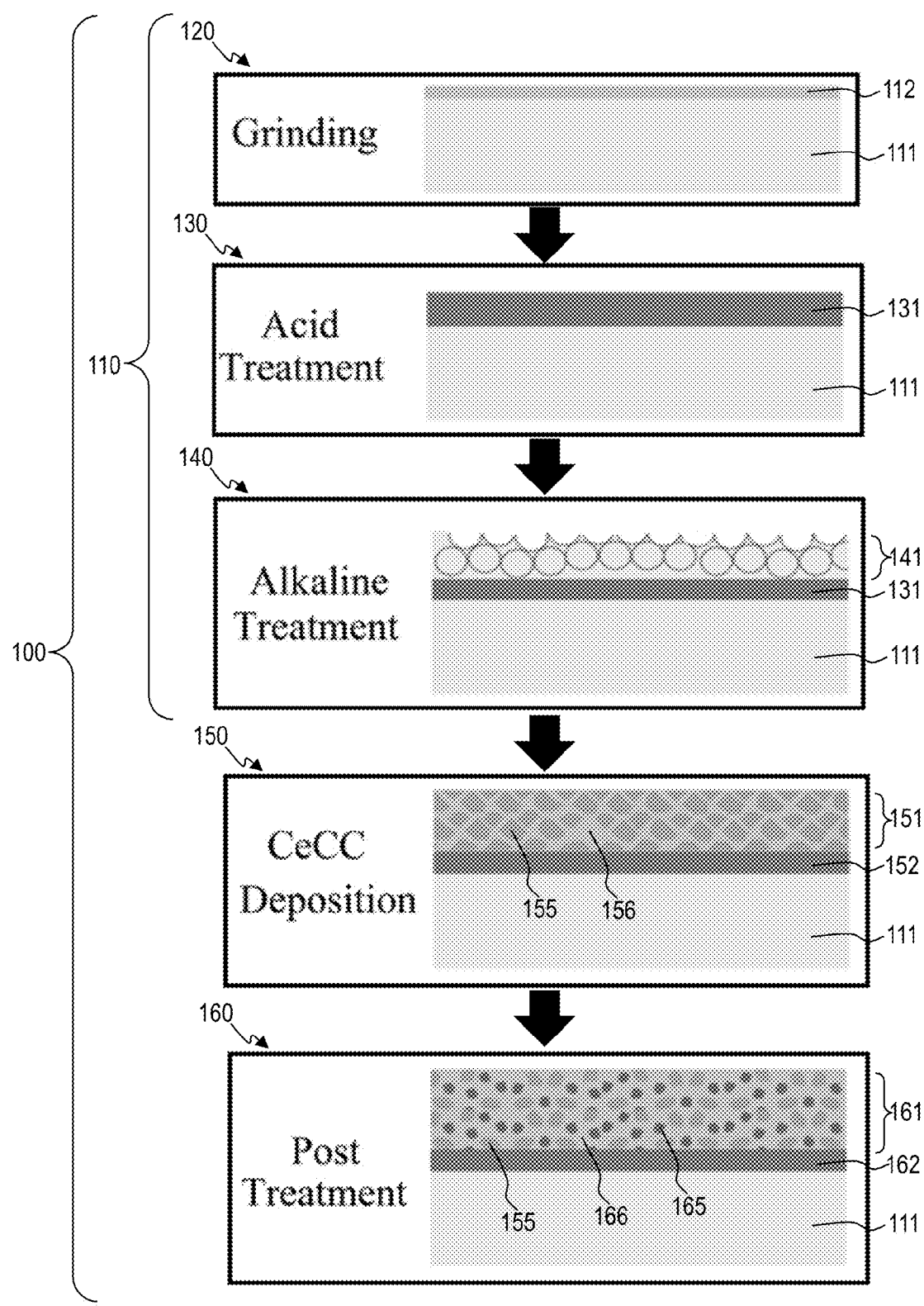
FIG. 1 shows a flow diagram illustrating a method for preparing a nano-structured composition, according to one embodiment of the disclosure.

The present invention is described with reference to the attached figures, wherein like reference numerals are used throughout the figures to designate similar or equivalent elements. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As used herein, the recited terms have the following meanings. All other terms and phrases used in this specification have their ordinary meanings as one of skill in the art would understand.

As used herein, "ambient conditions" refers to conditions at one or more of about standard temperature and about standard pressure (STP), or about 298.15 K (25° C., 77° F.) and about 100 kPa (14.504 psi, 0.987 atm), respectively. One of skill in the art will recognize that ambient conditions can vary based on factors such as elevation, season of the year, and global latitude, and such variations can readily be realized and considered when reviewing this disclosure. In particular, "ambient conditions" can refer to conditions near STP, wherein no significant heat or pressure variations are required to effect a desired effect (e.g., a redox reaction).

As used herein, "morphology" refers to the arrangement of one or more elements, on or more molecules, or combinations thereof. In particular, "morphology" can refer to surface characteristics of nano-scale coatings. For example, "morphology" may refer to cracking, or other structures (i.e., spheres or nodules) present on a surface.

As used herein, "nano", "nanocrystalline", "nanocrystal", "nanoscale", "nanostructured" refer to sizes, characteristics, and structures having nano dimensions, typically within the range of 0.01 nm to 1000 nm.

As used herein, "sunlight" refers to a broad spectrum of light wavelengths, including the visible light spectrum from about 400 nm to about 700 nm, but also including, for example, the Infra-Red spectrum from about 700 nm to about 1 mm and the ultraviolet spectrum from about 10 nm to about 400 nm. Sources of sunlight can include the sun, and other sources, for example, LEDS, and incandescent bulbs.

Unless otherwise specified, "cerium" and "Ce", as used herein, can refer to one or both of trivalent cerium (Ce(III)) or tetravalent cerium (Ce(IV)).

Nanostructured cerium oxides have promoted new applications such as photocatalysis, but the wide band gap of $CeO_2$ (i.e., 3.2 eV) limits absorption to UV light sources. A suitable water splitting photocatalyst will have a band gap wider than about 1.7 eV; have conduction band and valence band potentials that surround both $H_2$ and $O_2$ evolution potentials; be stable in various operating environments (e.g., low or high pH); be able to efficiently convert photons to electron-hole pairs; and allow for rapid migration of electron-hole pairs to the reaction surface such that charge recombination is sufficiently minimized. Corrosion resistance is critical for applications such as photocatalysis because charge transferred by the catalysts exacerbates self-degradation.

Provided herein are compositions comprising cerium-containing nanocrystals embedded in amorphous matrices. An amorphous matrix is a structure having no long range order or crystalline aspects, or where the lattice d-spacing becomes highly inconsistent. Particularly, an amorphous matrix can be characterized by having little or no identifiable lattice fringes. Crystalline aspects can include an ordered atomic pattern or lattice structure extending in three spatial dimensions. Cerium-containing nanocrystals can include trivalent and tetravalent cerium present as one or more of oxides (e.g., $Ce_2O_3$, $CeO_2$, and $CeO_{2-x}$ where $0.001<x<0.2$), hydroxides (e.g., $Ce(OH)_3$), and phosphates (e.g., $CePO_4$). The nanostructured cerium-based compositions, such as Ce oxides, provided herein have properties which are beneficially different than bulk Ce materials and other Ce materials known in the art (e.g., larger crystals). In particular, the nanostructured Ce compositions provided herein allow for a Ce(IV)/Ce(III) redox couple which is reversible in both directions (e.g., oxidation from Ce(III) to Ce(IV), and reduction from Ce(IV) to Ce(III)). In particular, the Ce(IV)/Ce(III) redox couple can be reversible at ambient conditions.

Further, the Ce(IV)/Ce(III) redox couple can be reversible at constant environmental conditions. Environmental conditions can include one or more of temperature, pressure, sunlight, and humidity. Such compositions, for example nanocrystalline $CeO_2$ and $CeO_{2-x}$, have heats of reduction which can be less than one-half of bulk crystalline samples. For example, in some embodiments, compositions disclosed herein may have a heat of reduction of about 2 eV, as compared to the heat of reduction of about 4 eV for bulk $CeO_2$. Reducing crystal size, for example crystal diameters less than about 50 nm and particularly less than 15 nm, can generally lead to lower heats of reduction. The calculated band gaps of these nanostructured CeCCs enable absorption of light wavelengths in the visible light spectrum. Therefore, photocatalytic reduction applications of Ce(IV) to Ce(III) can be more readily utilized in a wider range of conditions (e.g. ambient conditions). In addition, the nanostructured $CeO_{2-x}$ polycrystals provided herein have shown reduced grain boundary resistance and higher electronic conductivity than bulk cerium materials.

The compositions described herein exhibit self-healing behavior, in part due to the ready reduction of Ce(IV). Self-healing behavior includes one or more of reducing surface cracks, and improving general composition characteristics. For example, an improved composition characteristic could be increased electric conductivity or corrosion resistance. Self-healing behavior can occur when compositions described herein are exposed to one or more of ambient conditions, sunlight, and moisture. The decrease in cracks, and expansion of the lattice and volume changes can be attributed to, among other things, reduction of Ce(IV) and the larger ionic radius of Ce(III) compared to Ce(IV) ions and an increase in oxygen vacancies. Through photocatalytic reduction, the percentage of Ce(III) species out of all Ce species present in the CeCC can be increased by at least 13%, at least by 20%, or at least up to 33%. In some embodiments changes in oxidation state and lattice expansion of cerium oxides nanoparticles can correlate with particle size; the smaller the particle size, for example particles less than 15 nm, the larger the fraction of Ce(III) species and the larger the lattice parameter. In many embodiments, the $CeO_2$ and $CePO_4$ nanocrystals embedded in an amorphous matrix evolve to a mixture of larger $CeO_2$ and $CePO_4$ nanocrystals in the presence of sunlight. In some instances, the nanocrystals can increase in size by at least 1.5 about times, by at least about 2 times, or at least about 2.5 times.

In other embodiments, the Ce(IV)/Ce(III) redox couple is reversible by one or more of deprivation of sunlight, deprivation of moisture, and time. In some such environments, the environmental conditions can determine the rate and extent of the redox couple reversibility. For example, a photo-reduced composition can exhibit partial or full oxidation of reduced Ce compounds after 1 week, after 2 weeks, after 3 weeks, or after more than 4 weeks of sunlight deprivation. Reversal of Ce(IV) reduction can be indicated by one or more of color change (e.g., from translucent to yellow) and reappearance of cracks.

In some embodiments, to achieve Ce(IV) reduction the compositions are ideally exposed to sunlight in at least 45% relative humidity, at least 50% relative humidity, at least 55% relative humidity, at least 60% relative humidity, at least 65% relative humidity, or at least 70% relative humidity. Water can be an important electron donor for Ce(IV) to Ce(III) reduction.

In some embodiments, photo-induced color change is a functional feature of the compositions and methods provided herein. In other embodiments, color changes can indicate the ratio of Ce(III) to Ce(IV) species; orange to dark yellow coatings can indicate a more Ce(IV) rich composition whereas pale yellow to translucent colors can indicate a more Ce(III) rich composition.

The morphological changes exhibited by the compositions provided herein to fewer cracks and smaller nodule sizes during sunlight exposure indicate a change in CeCC structure. The exhibited self-healing behavior of coatings during sunlight exposure is beneficial for any further photo-induced process because corrosion can be inhibited and, in general, the integrity of the coating and the substrate can be protected.

Due to these characteristics, cerium oxide containing compositions as disclosed herein can be used, for example, in photocatalysis, corrosion resistant coatings, chemical degradation, UV protective coatings or sunscreens, solid oxide fuel cells, sensors, and other solid state electrochemical devices. For example, these cerium-containing compositions can be used as photocatalysts for toluene oxidation, azodye degradation, and water decomposition or splitting. In some embodiments, provided herein are nano-scale Ce-based compositions having band gaps suitable for photocatalysis by light sources outside the UV spectrum. Such materials are advantageous as they allow for more simplified and efficient photocatalytic applications which do not require photovoltaic and/or electrolytic systems. Specifically, band gaps ($E_g$) can be adjusted between about 2 to about 4 eV and the ratio of the Ce(III)/Ce(IV) species between 0.1 to 1.0, or more preferably between 0.2 to 0.9. As the Ce(III)/Ce(IV) ratio increases the band gap increases along with corrosion protection. Smaller ratios decrease the band gap and can be more beneficial for higher efficiency absorption of the sunlight spectra.

FIG. 1 shows an illustrative method 100 for preparing the compositions provided herein, and can comprise one or more of selecting a substrate 111, preparing 110 a substrate 111, depositing 150 a CeCC 151 on a substrate 111, and post-treating 160 the CeCC 151. Preparing 110 can comprise one or more of grinding/polishing 120 the substrate 111, acid treatment 130, and alkaline treatment 140. While suitable pre-treatment, deposition, and post-treatment techniques are provided and deemed advantageous and efficacious over others known in the art, it is also the particular compositions themselves which provide the advantages to which this disclosure is directed. Accordingly, the particular pre-treatment, deposition, and post-treatment techniques described herein are presented both for their novelty and as enablement, and the novel compositions presented herein are not intended to be limited thereby.

Suitable substrates 111, in general, will be more reactive or have negative electromotive forces, while more noble substrates, in some embodiments, are less preferable. In some embodiments, aluminum, magnesium, or combinations thereof are suitable substrates. In particular, AZXX and AMXX series alloys are suitable, including the major commercial alloys AZ31 (3 wt. % Al, 1 wt. % Zn, 0.2 wt. % Mn, and the balance Mg), AZ61 (6 wt. % Al, 1 wt. % Zn, 0.2 wt. % Mn, and the balance Mg) and AZ91 (9 wt. % Al, 1 wt. % Zn, 0.2 wt. % Mn, and the balance Mg), and AM30 (3 wt. % Al, 0.2 wt. % Mn, and the balance Mg) and AM60 (3 wt. % Al, 0.2 wt. % Mn, and the balance Mg). These alloys are generally available in rolled sheet form for shaping into body panels and the like. The nominal compositions as given are stated with the understanding that, in some embodiments, minor amounts of impurities may exist. Manganese is often added to control iron impurities in AZXX alloys. Embodiments containing Mn may comprise manganese-based compounds such as $Al_6Mn$ or $Al_2Mn$. Other alloys including AA 7075-T6 (5.6 wt. % Zn, 1.6 wt. % Cu, 0.3 wt. % Cr, 2.5 wt. % Mg and the balance Al), and AA 2024-T3 (0.6 wt. % Mn, 4.5 wt. % Cu, 1.5 wt. % Mg and the balance Al), and the like, are also suitable substrates for the compositions and methods provided herein. The above alloys can, in some embodiments, be suitable in Al Clad form. Other substrates having the same or similar composition and/or microstructure can similarly be suitable. Generally, more reactive substrates having negative electromotive forces Surface preparation 110 prior to CeCC deposition 150 must be appropriate for the process as inadequate treatment can produce inhomogeneous and/or non-adherent coatings. For example, the presence of the β phase at the surface of AZ91D alloys can be desirable for good corrosion properties, but it may be detrimental for uniform coating deposition. Appropriate control of the β phase can be obtained by a combination of acid and alkaline surface preparation steps which influence the electrochemical nature of the surface for subsequent coating deposition. Surface preparation can comprise one or more of grinding/polishing, acid treatment, and alkaline treatment.

The morphology and photocatalytic and other properties of the compositions described herein may be related to one or more of the substrate surface preparation, and the microstructure of the final coating. For example, the type of deposition substrate (e.g. AZ91D Mg alloy), and/or the substrate preparation process, including both the type and order of preparation steps, can affect the properties of a coating deposited on the substrate. These results can be substrate specific. In some cases, a preferred preparation method for an AZ91D Mg alloy substrate comprises an alkaline cleaning, or an acid cleaning followed by an alkaline cleaning. A suitable pretreatment method for AZ31 and AZ91 Mg alloys can comprise surface grinding followed by acid and then alkaline immersion cleaning.

Surface grinding and/or polishing 120 can remove surface contaminants from the fabrication process and the thick oxide/hydroxide layers that formed naturally on the surface. Removing surface contaminants can be critical as they can create active cathodic sites which serve to exacerbate corrosion and may also affect subsequent coating processes.

Grinding a Mg and Al substrate provides a surface 112 comprising Mg oxides and hydroxides and Al oxides and hydroxides. Grinding can be accomplished by methods known in the art, such as by silicon carbide medium. The topography of a ground substrate, in some cases, can perpetuate to the final CeCC.

Pretreatment cleaning and other methods can change the composition of a substrate's surface. For example, pure Mg and AZ80 when immersed in water for 48 hours can form a $Mg(OH)_2$ outer layer on the top of an inner MgO-rich layer. In general, a combined layer about 700 nm thick can form on a pure Mg substrate while a combined layer about 200 nm thick can form on a AZ80 substrate. Similar layers can form on pure Mg substrates when exposed to alkaline solutions (e.g., 1MNaOH) for 48 hours, but because Mg passivates in basic solutions and thinner layers are typically formed (e.g., <400 nm).

Acid treatment 130 can further remove surface contaminants and create a more homogenous and active alloy surface thereby promoting thicker and more adherent and protective coatings as compared to coatings deposited on polished or as-received alloy surfaces. In some embodiments, acid treatment 130 can be performed until all native oxide layers are removed. Acid treatment 130 will form a new layer 131 having a composition different from the substrate 111.

Acid treatment 130 often favors oxide formation over hydroxide formation, for example, by forming up to about 85% oxides. Acid treatment 130 can change the surface composition and morphology relative to the underlying Mg alloy, for example, by increasing the atomic percent (at. %) of Al in a newly formed layer by up to about 1.5 times, up to about 2 times, up to about 2.5 times, up to about 3 times, or greater than about 3.5 times that of the Mg alloy. Increasing Al content in the newly formed layer 131 can increase corrosion resistance as Al rich oxides and hydroxides are typically more stable in a wider range of environments (e.g., pH variations, reactive species, etc) than Mg oxides and hydroxides. Accordingly, acid solution concentrations and/or application durations can be increased, individually or cooperatively, to increase Al content in the newly formed layer 131.

For example, Al content in the newly formed layer 131 can be increased up to about 2 times, up to about 3 times, up to about 4 times, up to about 5 times, or greater than about 5 times that of the Al content in the substrate. Acid treatments 130 can also be tuned to adjust Al content with respect to Mg content in the newly formed layer 131. For example, the Mg/Al ratio in the newly formed layer 131 can be decreased to about 20, to about 15, to 10, to about 5, or to less than about 5 the Mg/Al ratio of the substrate. In most embodiments, the Mg and Al species comprising the newly formed layer 131 are predominately oxides.

In some embodiments, acid treatment 130 duration and/or acid treatment concentrations can be tuned to achieve a desired thickness for the newly formed layer 131. The newly formed layer can be, for example, about 5 nm to about 50 nm thick, although thicker layers are practicable provided adherence and uniformity aspects of the layer are maintained.

Acid treatment 130 can be performed using sulfuric acid, nitric acid, hydrofluoric acid, or other acids known to those of skill in the art. Different acids can be preferential for different Mg alloys. For example, nitric acid treatment on AZ91D alloys can preferentially etch the Mg/Al phase boundaries and promote a relatively homogeneous dissolution of the Mg phase. In some embodiments, after mechanical processes prepare a deposition substrate the substrate can be immersed in a 1 wt. % $HNO_3$ aqueous solution for 30 seconds. When no mechanical processes are used to prepare Mg alloys for coatings, acid treatments can be performed at higher concentrations and longer immersion times to remove contaminants and the native oxide layer. In some embodiments, acid treatment 130 is performed by spraying and/or immersing a substrate in an aqueous bath. Acid treatment 130 can be followed with a water wash, for example a deionized water wash.

Alloys, such as Mg alloys, treated with acid can be further enhanced by alkaline treatment 140 to modify a substrate or the layer 131 formed during a prior acid treatment. Alkaline treatment 140 can fully or partially change the composition and/or morphology of the layer 131 formed during acid treatment 130. For example, a portion of layer 131 can be altered via alkaline treatment 140 to create an altered layer 141, and a portion of layer 131 remains present between altered layer 141 and substrate 111. In some embodiments, a substrate can undergo alkaline treatment 140 without a prior acid treatment 130. In such embodiments, alkaline treatment can form a layer 141 having a composition and/or morphology different from the substrate 111 and superficial native layer, if present.

Alkaline treatment 140 promotes selective Al dissolution from the surface layer 131 or the substrate 111, and can form a porous layer 141 which is predominantly comprised of Mg and Al hydroxides. For example, selective dissolution of Al rich phases in AZ91D occurs when the combination of an acidic solution is used to expose the aluminum phase and a subsequent alkaline solution is used to dissolve that phase. The increased surface area provided by Al dissolution can enhance adhesion and corrosion resistance of subsequent conversion coatings. Therefore, the concentration and contact time of alkaline treatment 140 can be tuned to create an increasingly porous surface. Additionally, prior acid treatment 130 can be cooperatively tuned to modify the Al content of the layer 131 formed during acid treatment 130 to provide more or less Al available for dissolution.

In many embodiments, the Al content of the alkaline-modified layer 141 has greater Al content than the substrate 111. In such embodiments comprising a prior acid treatment 130, the Al content is typically lower in the alkaline-modified layer 141 than the layer formed during acid treatment 131. In other embodiments, the alkaline-modified layer 141 has less Al content than the substrate.

Alkaline treatments 140 are further useful in controlling the hydroxide species present in layer 141. The hydroxide species are important for promoting spontaneous deposition of CeCCs. When metal substrate, particularly Mg substrates or Mg alloy substrates, panels are immersed into the acidic CeCC deposition solution, the OH— groups associate with the metallic hydroxides. Breakdown of the hydrogen peroxide species raises the pH near the surface of the metal substrate, enhancing spontaneous deposition of cerium species. Spontaneous deposition is deposition which occurs, for example, without an applied electric potential.

Accordingly, the concentration of the alkaline solution and the application time thereof to a surface layer can be modified to achieve a desired surface composition. In some embodiments, a suitable aqueous alkaline solution comprises about 5 wt. % of $Na_2SiO_3.5H_2O$. In other embodiments, NaOH can be used, particularly with Al alloys and Mg alloys (e.g., AZ31, AZ61, AZ91, AM60, and AM30). Another example of a suitable alkaline cleaner is an aqueous solution of sodium carbonate containing about 5 percent by weight of sodium carbonate. The order and means of application of aqueous acid cleaning and alkaline cleaning is a matter of choice, and the application and/or immersion times can similarly be modified. This step can be followed with a water wash, for example a deionized water wash, before the CeCC 151 is deposited.

A CeCC 151 can be deposited 150 on a substrate 111 by immersion in an aqueous cerium-containing bath. In some embodiments a layer 152 is present between the deposited CeCC 151 and the substrate 111. Layer 152 can comprise one or more of layer 131 and layer 141. In some embodiments layer 152 is not present because one or more of an acid treatment 130 or an alkaline treatment 140 was not performed before CeCC deposition 150. In other embodiments, layer 152 is not present because CeCC deposition 150 fully altered the composition and/or morphology of a prior layer present on the surface of a substrate 111.

Elemental Ce can comprise about 0.1 wt. % to about 2.0 wt. % of the aqueous bath. Suitable sources of Ce include $CeCl_3\text{-}7H_2O$ and $Ce(NO_3)_3\text{-}6H_2O$. Typically depositing CeCCs 151 on metal substrates 111, such as AZ31 Mg alloys, can require long immersion times (e.g., >30 min) for suitable purposes, such as providing effective corrosion inhibition or achieving desired CeCC 151 thicknesses. The aqueous bath can further comprise an accelerator, such as an organic accelerator. For example, small additions of hydrogen peroxide (e.g., <8 wt. % $H_2O_2$) to the CeCC solution can greatly reduce the deposition time, in addition to affecting the Ce(III) to Ce(IV) ratio. Anti-bubbling agents can also be added to improve CeCC 151 quality by one or more of reducing gas bubble generation during deposition, altering the deposition kinetics, and modifying nanocrystal size. An example of an anti-bubbling agent are organic and synthetic gelatins, which can be added in small amounts from about 10 ppm to about 1,000 ppm, or from about 400 ppm to about 800 ppm. In some embodiments gelatin can allow for a more uniform and adherent CeCC 151. In some embodiments, pH of the aqueous solution is adjusted using acid, such as HCl, to suitable levels. For example, a pH between about 1.0 and about 3.5, or a pH between about 2.3 to about 2.7 can be suitable.

The cerium present in the CeCC comprises both Ce(III) and Ce(IV) species. A deposited CeCC 151 can be about 100 nm to about 1,000 nm thick, about 200 nm to about 800 nm thick, or about 300 nm to about 600 nm thick. For example, a CeCC 151 can be about 400 nm thick. Deposition thickness can alter the ratio of Ce(III) to Ce(IV) and the CeCC 151 band gap.

In general, the CeCC 151 comprises nanocrystals 155 no larger than 50 nm in diameter embedded in an amorphous matrix 156. One or both of the nanocrystals 155 and the amorphous matrix 156 comprise cerium in at least an oxide form, a hydroxide form, and a phosphate form. Ideally, the CeCC 151 comprises Ce-containing nanocrystals 155 about 1 nm to about 20 nm in diameter, about 2 nm to about 15 nm in diameter, or about 3 nm to about 10 nm in diameter. In some embodiments the CeCC 151 will comprise Ce-containing nanocrystals 155 less than about 5 nm in diameter, less than about 4.9 nm in diameter, less than about 4.8 nm in diameter, less than about 4.7 nm in diameter, less than about 4.6 nm in diameter, less than about 4.5 nm in diameter, less than about 4.4 nm in diameter, less than about 4.4 nm in diameter, less than about 4.3 nm in diameter, less than about 4.2 nm in diameter, less than about 4.1 nm in diameter, or less than about 4.0 nm in diameter.

The unique surface nano-morphology and composition comprising one or more of Ce oxides, hydroxides, and phosphates, or particularly two or more of Ce oxides, hydroxides, and phosphates, or comprising Ce oxides, hydroxides, and phosphates are preferably achieved by the spontaneous deposition methods as described herein. Other deposition methods including electrocoating, sputtering, and MOCVD, known in the art can be suitable provided they are able to achieve the particular compositions and morphologies as described herein.

In some embodiments a CeCC 151 is post-treated 160 by immersion in an aqueous phosphate-containing bath. In some embodiments a layer 162 is present between the deposited post-treated CeCC 161 and the substrate 111. Layer 162 can comprise one or more of layer 152 and CeCC 151 as discussed above. In some embodiments layer 162 is not present because one or more of an acid treatment 130 or an alkaline treatment 140 was not performed before CeCC deposition 150. In other embodiments, layer 162 is not present because CeCC post-treatment 160 fully altered the composition and/or morphology of a prior layer or layers present on the surface of a substrate 111.

Elemental P can comprise about 0.5 wt. % to about 0.8 wt. % of the aqueous post-treatment bath. Suitable sources of P include $NaH_2PO_4$ and $NH_4H_2PO_4$. Post-treatment 160 can also reduce cracks present in a CeCC 151 and reduce the size of cerium-containing nodules deposited during a prior CeCC coating 150. For example, Ce-containing nanocrystal diameters can be less than about 50 nm, less than about 25 nm, less than about 10 nm, about 5 nm, or less than about 5 nm. Lattice spacing can be about 0.32 nm. Similar to the deposited CeCC 151, the post-treated CeCC 161 comprises nodular Ce-oxide nanocrystals 155 and Ce phosphate nanocrystals 165 embedded within an amorphous matrix 166. This layer can comprises a combination of {102} hexagonal structure $CePO_4.H_2O$ and {111} cubic structure $CeO_2$ and $Ce_2O_3$. In some embodiments, Ce hydroxide nanocrystals are additionally present within the amorphous matrix 166.

Phosphate post-treatment 160 of a CeCC can alter the microstructure and morphology of the coating compounds and can effect various responses and evolutions of a CeCC to ambient and other environments. Particularly, the overall ratio of Ce(IV) species to Ce(III) species in both the amorphous and crystalline regions can be decreased, and ultimately the band gap of the resulting CeCC can be manipulated thereby. Prior to phosphate post-treatment 160, the amorphous matrix 156 generally has a lower Ce(IV) to Ce(III) ratio than the nanocrystalline phases. However, this does not necessarily hold true after phosphate post-treatment 160 as the Ce(III) species can increase at a higher rate in the crystalline regions 155 and 165 than the amorphous matrix 166. The increase in Ce(III) species, in the crystalline and amorphous matrix regions, is at least in part due to the formation of $CePO_4$. Therefore, manipulating post-treatment times and/or the concentration of post-treatment solutions can be used to tune the band gap of the post-treated CeCC. The band gap can be further manipulated by exposure to sunlight.

The minimum potential difference (voltage) needed to split water is 1.23V at 0 pH and ambient conditions, corresponding to a minimum theoretical light wavelength of about 1000 nm. Provided herein are methods and compositions having suitable electronic structures and optical properties such that reduction of Ce(IV) species is promoted only by one or more of ambient conditions and direct sunlight exposure. In particular, the compositions provided herein have conduction and the valence band potentials above and below the hydrogen and oxygen evolution reactions, wherein each range is independently or cooperatively tunable based on, for example, composition pre-treatment, deposition, and post-treatment techniques as described herein, and exposure to one or more of sunlight and ambient conditions.

The cerium-based compositions deposited on Al and Mg alloys as described herein are suitable for this purpose and are able to absorb visible light, UV light, and more energetic wavelengths, due to the tunable band gap range of about 2 eV to about 4 eV. In particular, some as-deposited CeCCs can have a band gap range of about 2.1 eV to about 2.8 eV. In some embodiments, phosphate post-treated CeCCs can have a band gap differential range of about 2.5 eV to about 3.2 eV. Sunlight can similarly affect the band gap of a CeCC composition, for example by increasing a given band gap value by up to about 0.1 eV, up to about 0.2 eV, up to about 0.3 eV, up to about 0.4 eV, up to about 0.5 eV, up to about 0.6 eV, up to about 0.7 eV, up to about 0.8 eV, up to about 0.9 eV, or up to about 1.0 eV. In some embodiments the band gap of a CeCC is increased through Ce(IV) species reduction to Ce(III) species by sunlight in the presence of water. Accordingly, in some embodiments the CeCCs are capable of absorbing light having a range of threshold wavelengths, for example less than about 590 nm.

While not wanting to be limited to any one photocatalytic water splitting model, the following proposed model is presented below, which may explain the reduction of Ce(IV) into Ce(III) using electrons trapped at the oxygen vacancies while holes are used to oxidize water.

1. Light with a wavelength ($\lambda$)<490 nm absorbed by the CeCC:

$CeCC + h\nu \rightarrow e^-_{CB} + h^+_{VB}$

If nothing else the pair recombines.

$e^-_{CB} + h^+_{VB} \rightarrow$ recombination $\rightarrow$ heat

2. $e^-_{CB} + h^+_{VB}$ might get trapped by surface defects:

$e^-_{CB} \rightarrow e^-_{tr}$
$h^+_{VB} \rightarrow h^+_{tr}$

3. $Ce^{4+}$ species scavenge away $e^-_{tr}$ forming $Ce^{3+}$ $e^-_{tr} + Ce^{4+} \rightarrow Ce^{3+}$ 4. Simultaneously, the $h^+_{tr}$ oxidize adsorbed water molecules.

$4 h^+_{tr} + 2H_2O \rightarrow 4H^+_{aq} + O_2(gas)$ where CB denotes the conduction band, VB denotes the valence band, e− denotes an electron, h+ denotes an electron hole, by denotes energy or light, tr denotes a trapped hole or electron, and NHE denotes a normal hydrogen electrode.

Example 1: Forming a CeCC on a Mg Substrate

Forming a CeCC on a Mg substrate includes (A) grinding the substrate to form Layer A, (B) acid cleaning to form Layer B, (C) alkaline cleaning to form Layer C, (D) CeCC deposition to form Layer D, and (E) Phosphating to form Layer E.

Step A: Panels of AZ31B Mg alloy of dimensions 100 mm by 50 mm by 2 mm were mechanically polished using 180 grit abrasive silicon carbide papers. The ground surface reacted quickly with the ambient environment forming a homogenous thin layer A. This oxide/hydroxide layer was Al-enriched compared to the base AZ31B Mg alloy and contained approximately equal amounts of oxide and hydroxide compounds. The nominal elemental surface composition of the AZ31B Mg alloy is given in Table 1, along with the elemental quantification in atomic percent (at. %) of the superficial layers formed at each of the foregoing steps of this example.

TABLE 1

Nominal composition of AZ31B Mg Alloy and Summary of Elemental Quantification in Atomic Percent (at. %) of Superficial Layers Formed Thereon.

| | Nominal AZ31B | Layer A | Layer B | Layer C | Layer D | Layer E |
|---|---|---|---|---|---|---|
| O 1s | N/A | 57.4 | 54.1 | 53.4 | 69.4 | 70.5 |
| Mg 2p | 95.9-97.4 | 40.7 | 38.4 | 34.4 | 6.6 | 7.9 |
| Al 2p | 2.3-3.2 | 1.8 | 7.3 | 4.6 | 0.8 | 1.9 |
| Zn 2p | 0.3-0.5 | 0.1 | 0.2 | 0.0 | 0.0 | 0.2 |
| Mn 2p | 0.1-0.5 | 0 | 0 | 0 | 0 | 0 |
| Si 2s | N/A | N/A | N/A | 7.6 | 0 | 0 |
| Ce 3d | N/A | N/A | N/A | N/A | 23.2 | 8.9 |
| P 2p | N/A | N/A | N/A | N/A | N/A | 10.6 |

Figure 2A:
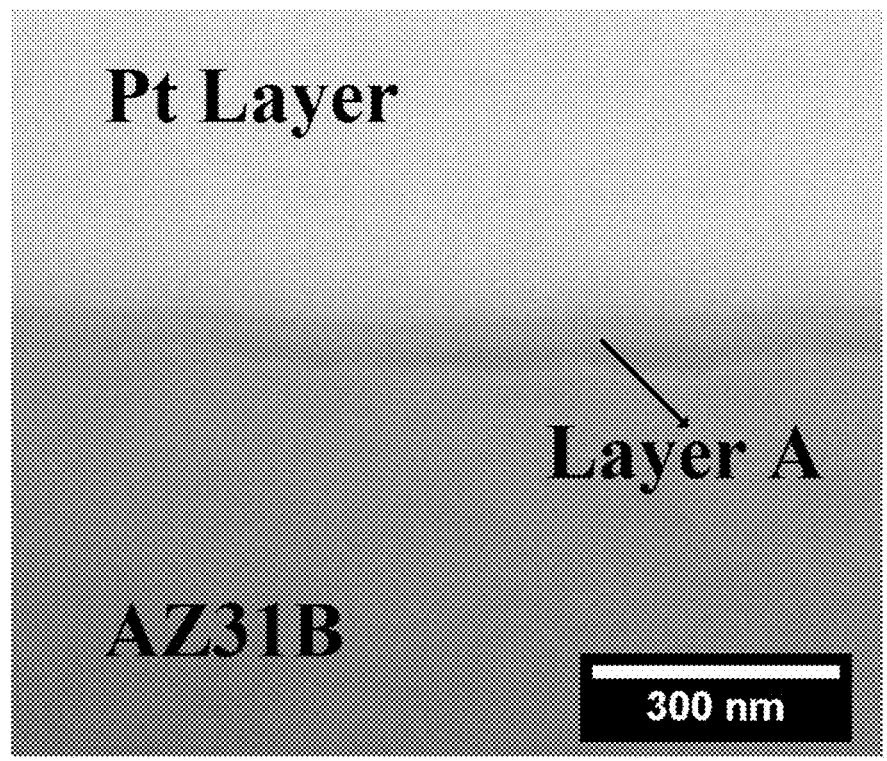
FIG. 2A shows a cross-sectional view of a prepared substrate, according to one embodiment of the disclosure.
Figure 2B:
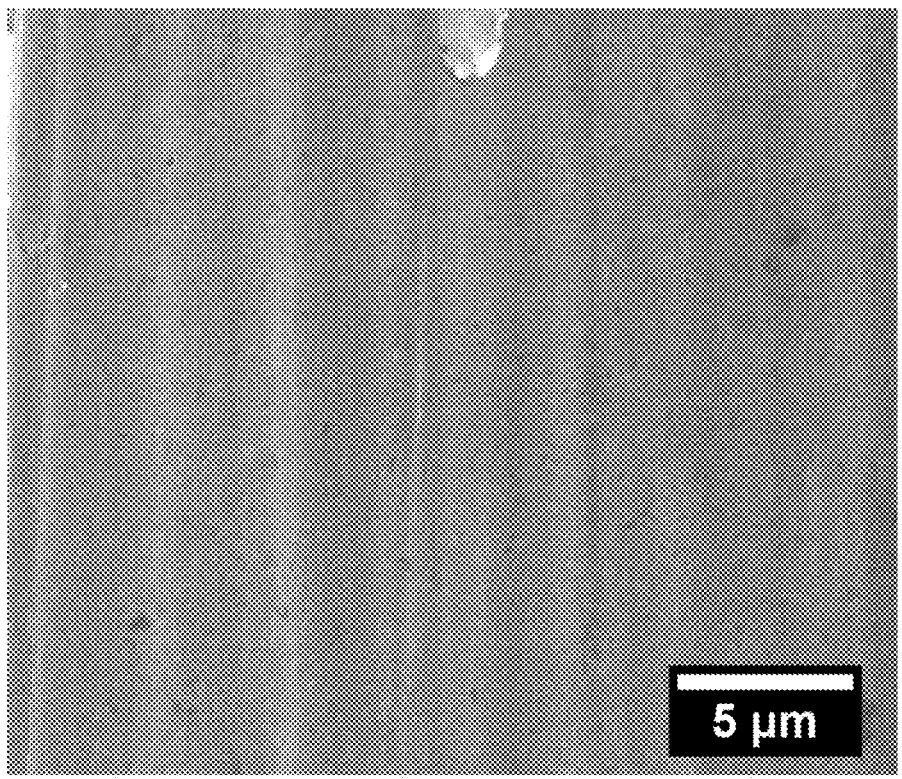
FIG. 2B shows a top view of a surface of a prepared substrate, according to one embodiment of the disclosure.

The panels were cleaned with isopropyl alcohol, rinsed with deionized (DI) water, and finally dried at room temperature to provide layer A as shown in FIGS. 2A-B. Surface A had relatively homogeneous surfaces with grooves that were attributed to the grinding (180 grit). Although some areas of contrast were observed, no inclusions or second phases were exposed on the surface. FIG. 2A shows a cross section of the surface presented in FIG. 2B. A homogeneous layer about 50 nm thick formed on the surface of the AZ31B Mg alloy during the grinding step (layer A). Chemical analysis of the surface performed with a Kratos Axis 165 X-ray photoelectron spectrometer (XPS) indicated the presence of Mg, Al, Zn, O and C, shown in Table 1. The uncorrected Mg and Al contents of 40.7 at. % and 1.8 at. %, respectively, are close to the nominal corrected composition of AZ31B. However, layer A was slightly Al enriched since the Mg/Al at. % ratio calculated from Table 1 was about 23 and the expected ratio for the nominal composition is in the range of 29 to 42. Layer A was found to be about 59 at. % oxides and about 41 at. % hydroxides by high resolution XPS(HRXPS) measurement of Mg 2p and O 1s. Of the Mg species, oxides accounted for about 58 at. % and hydroxides accounted for about 42 at. %.

Figure 3A:
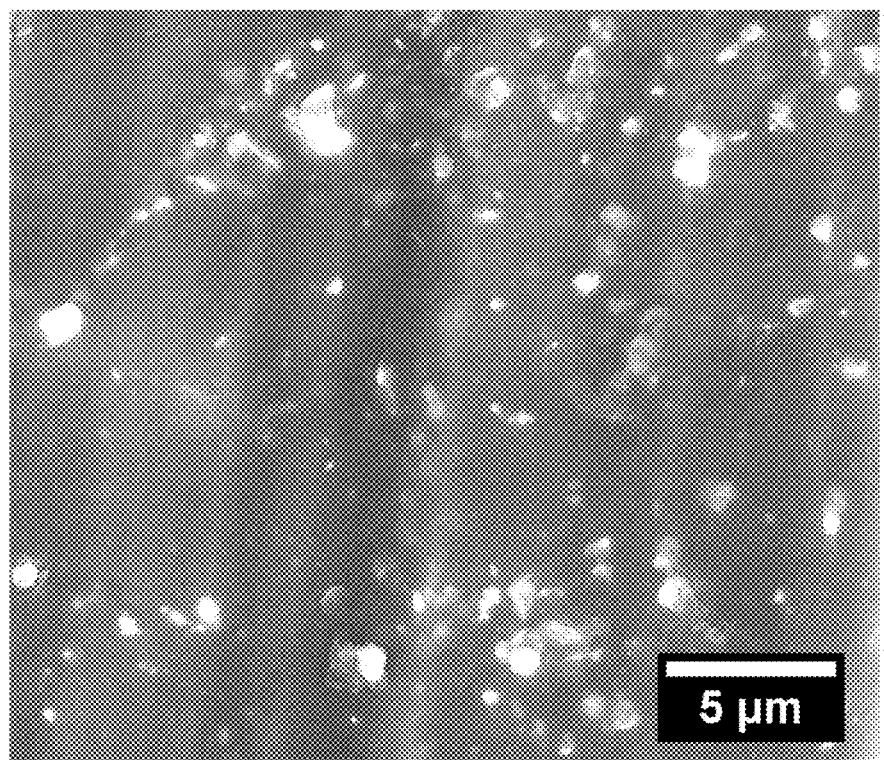
FIG. 3A shows a top view of a surface of a prepared substrate, according to one embodiment of the disclosure.
Figure 3B:
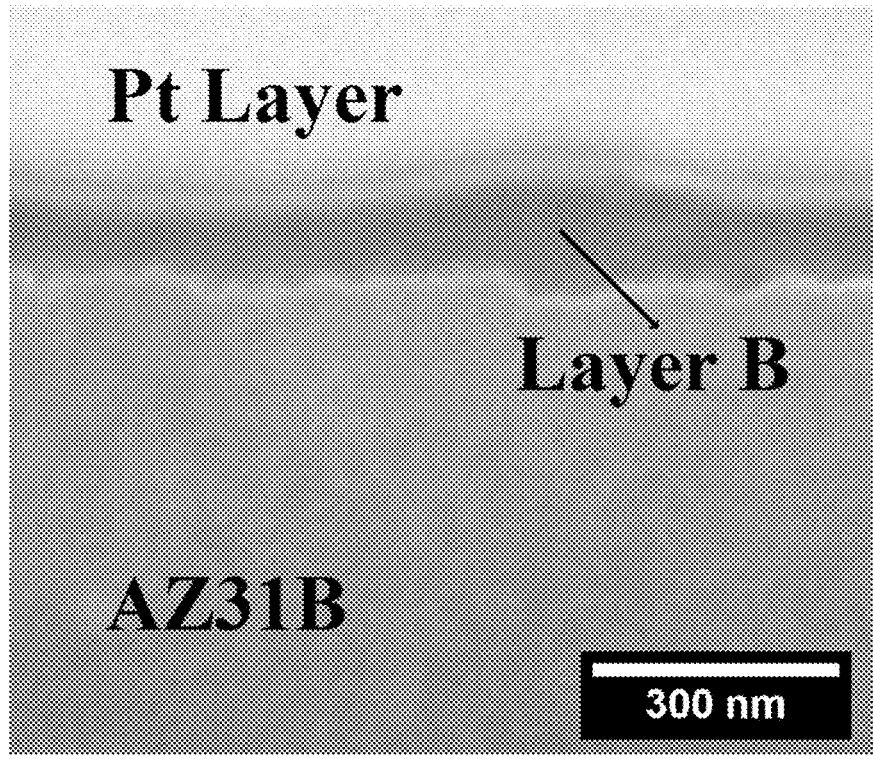
FIG. 3B shows a cross-sectional view of a prepared substrate, according to one embodiment of the disclosure.

Step B: Panel surfaces were next pretreated in 1 wt. % HNO$_3$ aqueous solution for 30 seconds to provide layer B, which contained bright Al rich particles easily distinguished from the darker Mg matrix as shown in FIG. 3A. Although AZ31B is expected to be a single phase alloy, chemical analysis by energy dispersive X-ray spectroscopy (EDS) confirmed that bright areas were rich in Al and Mn. EDS was performed with a dual beam Helios NanoLab 600 equipped with an EDS detector to perform chemical analysis coupled with the electron beam for SEM characterization and a focused ion beam (FIB) that was used to deposit a protective Pt layer over the surfaces at each stage of CeCC preparation. The encapsulated surfaces were then milled, thinned and polished to obtain cross-sections. The acid treatment removed the thin native oxide/hydroxide layer present after step A forming Layer B, a new homogeneous layer about 90 nm thick as shown in FIG. 3B. The cross-sectional image shown in FIG. 3B corresponds to areas where no Al rich particles were visible from the top view. The elemental quantification calculated from the XPS spectrum of layer B is presented in Table 1. The Mg/Al atomic ratio in layer B was about 5, which was much smaller than the Mg/Al ratio in layer A (about 23). The Al enrichment was due to the faster dissolution rate of Mg in acidic solutions compared to Al. Fitting of Mg 2p and O 1s peaks showed that layer B was found to be about 85 at. % oxides and about 15 at. % hydroxides, by high resolution XPS(HRXPS) measurement of Mg 2p and O 1s. Of the Mg species, oxides accounted for about 74 at. % and hydroxides accounted for about 26 at. %.

Figure 4A:
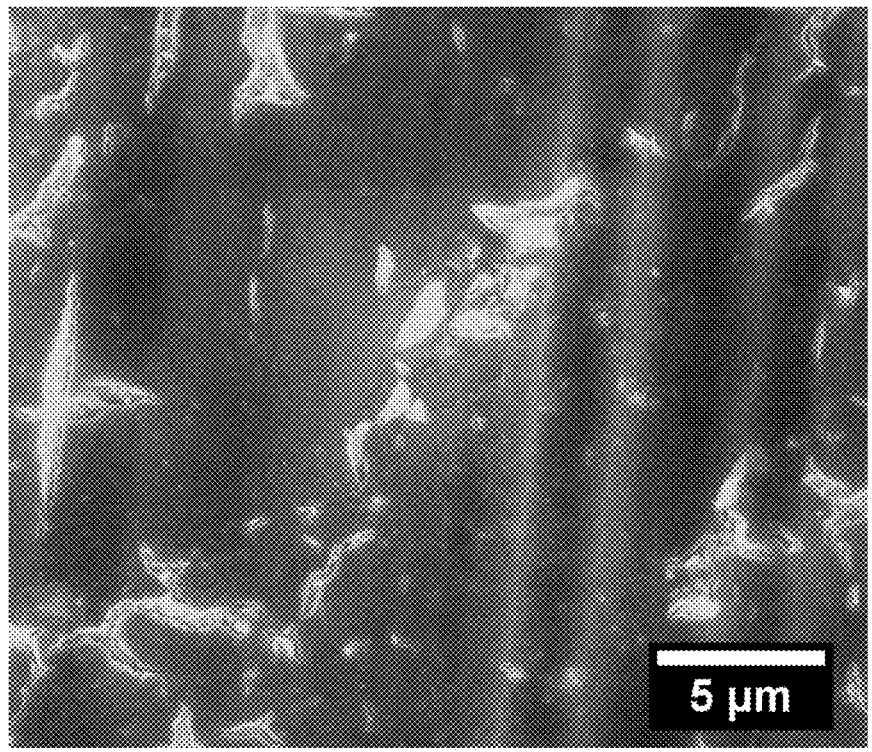
FIG. 4A shows a top view of a surface of a prepared substrate, according to one embodiment of the disclosure.
Figure 4B:
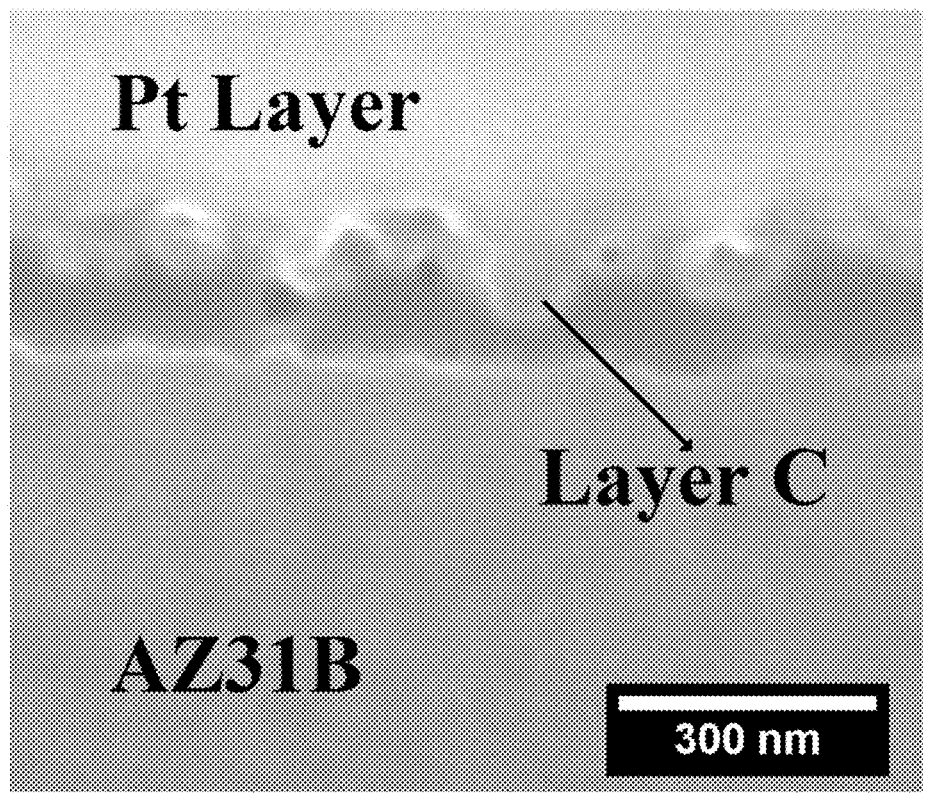
FIG. 4B shows a cross-sectional view of a prepared substrate, according to one embodiment of the disclosure.

Step C: Panel surfaces were next cleaned in an alkaline aqueous solution containing 5 wt. % of $Na_2SiO_3.5H_2O$ for 5 minutes at room temperature in order to provide layer C. No Al inclusions were observed after the alkaline treatment and the bright areas observed on the surface, shown in FIG. 4A, were caused by charging effects due to the layer formed on the surface, not particles of different atomic number. FIG. 4B presents a cross-section image of the surface shown in FIG. 4A, and shows a new porous layer C. Chemical analysis by EDS confirmed that the porous top layer was richer in Al than the inner layer. Layers B and C had a total thickness of about 180 nm. Layer C contained Mg, Al, Si, O and C and quantification results obtained from XPS are presented in Table 1. The Mg/Al atomic ratio for layer C increased to about 8 and can be explained by the preferential dissolution of Al in alkaline solutions while Mg is passivated. The Al dissolution may also explain the porosity observed in layer C. Layer C was found to be about 11 at. % oxides and about 89 at. % hydroxides by high resolution XPS(HRXPS) measurement of Mg 2p and O 1s. Of the Mg species, oxides accounted for about 5 at. % and hydroxides accounted for about 95 at. %.

Figures 5A, 5B:
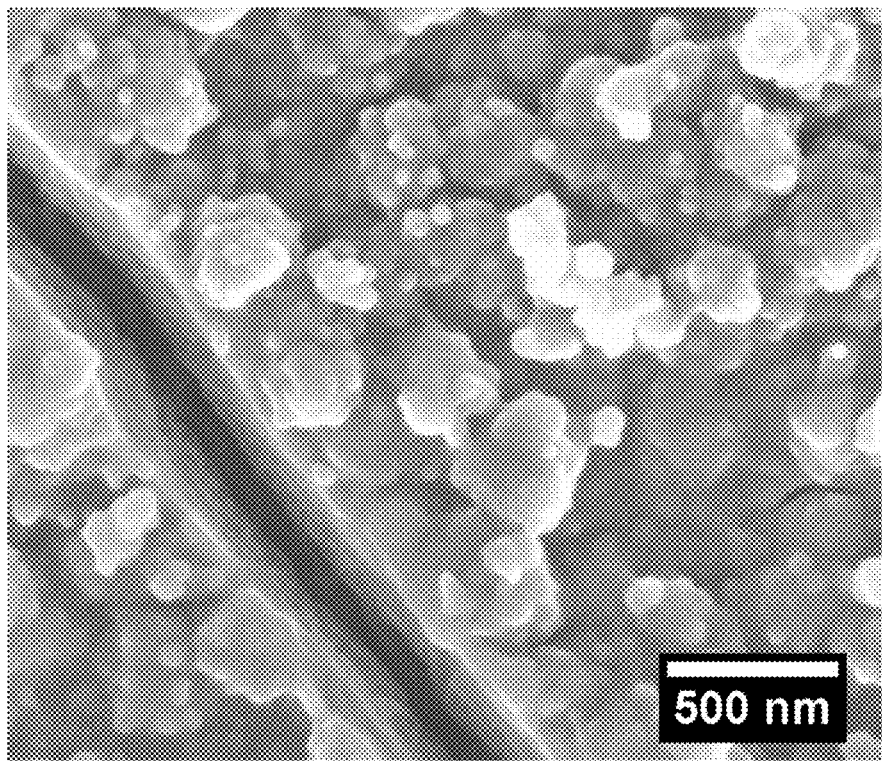
FIG. 5A shows a top view of a surface of a deposited composition, according to one embodiment of the disclosure.
FIG. 5B shows a cross-sectional view of a composition deposited on a substrate, according to one embodiment of the disclosure.

Step D: Panel surfaces were next immersed in an acidic cerium-based aqueous solution for 120 seconds to provide layer D. The deposition solution consisted of 4 wt. % of $CeCl_3.7H_2O$ (99.9%, Alfa Aesar), 6.7 wt. % of $H_2O_2$ (Fisher Chemical, 30 vol %) and 0.25 wt. % of organic gelatin (RDH, Rousselot) in DI water. The deposition solution was prepared by dissolving cerium chloride salt in DI water followed by a pH adjustment to about 2.1 using HCl. The hydrogen peroxide was added into the solution a few minutes before deposition. The initial pH of the CeCC deposition solution was 2.3, with cerium species present as $Ce^{3+}$ ions. In the presence of $H_2O_2$, the $Ce^{3+}$ ions precipitate as Ce hydroxides or hydrated oxides such as $CeO_2.2H_2O$. Layer D had a dense morphology and appeared to be well bonded with the Mg surface. The surface of layer D formed during immersion in the cerium-based solution is shown in FIG. 5A. High resolution tunneling electron microscope (HR-TEM) images of layer D showed that nanocrystals of cerium oxide that were <5 nm in diameter were embedded in an amorphous matrix. A cracked surface with small Ce-rich spherical particles was observed on the surface of layer D. The cross-section of layer D in a region with no cracks is presented in FIG. 5B. After CeCC deposition, only two layers were observed, an inner layer, which had a similar appearance to layer B and an outer layer D. Layer D was the as-deposited CeCC and was about 400 nm thick.

The CeCC layer was deposited onto a surface that initially had the appearance of the previous layer C by partially filling the pores of layer C and incorporating some of the species into the converted surface. Chemical analysis performed by XPS showed that the top surface of layer D was mainly composed of Ce and O with other small amounts of Mg, Al, and C as shown in Table 1. The elemental quantification calculated from the XPS spectrum of layer D is presented in Table 1. Layer D was found to be about 37 at. % Ce(III) and about 63 at. % Ce(IV) by high resolution XPS(HRXPS) measurement of Ce 3d.

Figure 6A:
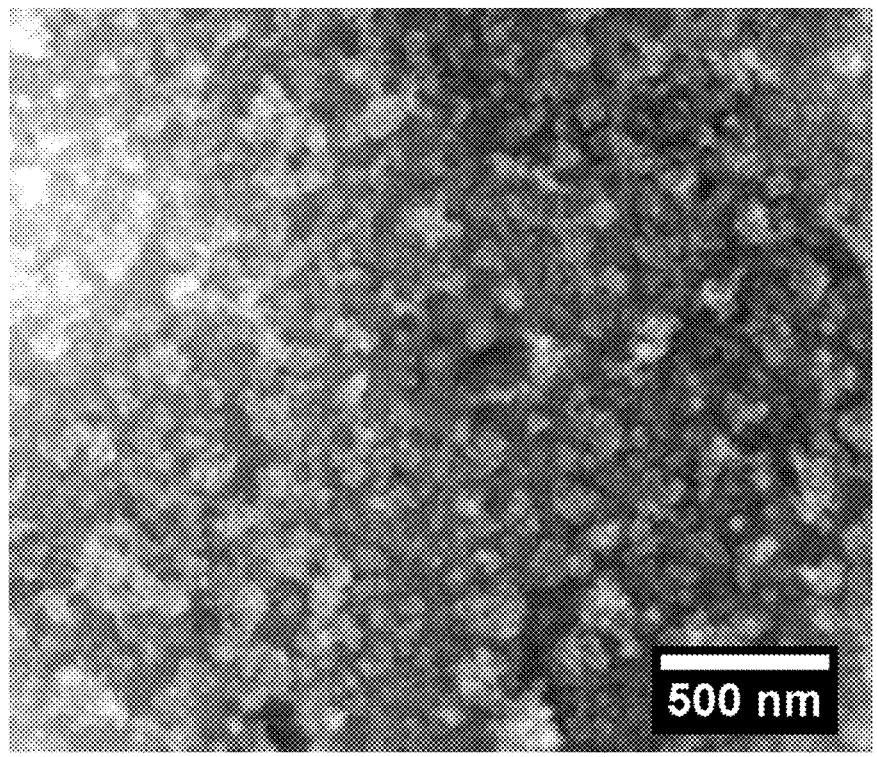
FIG. 6A shows a top view of a surface of a post-treated composition, according to one embodiment of the disclosure.
Figure 6B:
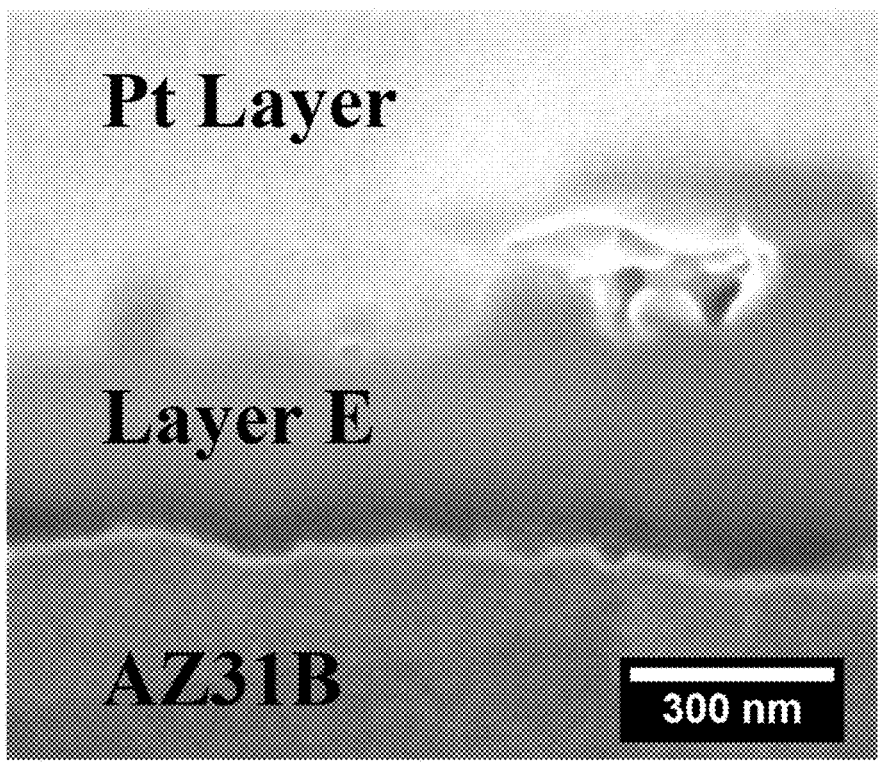
FIG. 6B shows a cross-sectional view of a post-treated composition deposited on a substrate, according to one embodiment of the disclosure.

Step E: Following CeCC deposition, the coated panels were post-treated for 5 min at 85° C. in a 2.5 wt % $NaH_2PO_4$ aqueous solution to provide a final Layer E. FIG. 6A shows the CeCC after phosphate treatment. Post-treatment yielded a dense, homogeneous coating with fewer cracks and smaller nodules than the as-deposited layer D. The homogenous surface exhibited no significant differences in chemical composition or structure in any given area as compared to another (i.e., uniform Ce content and number of nanocrystals per unit area). FIG. 6B illustrates a cross-sectional image of the post-treated sample and shows Layer E to be a homogeneous and dense structure. The measured thickness of layer E about 400 nm, was about the same as layer D. Hence, this was not a new layer over layer D, but an alteration of layer D due to the phosphate post-treatment.

The XPS analysis indicated that layer E was mainly composed of Ce, P, O, Mg, Al and Zn as shown in Table 1. Phosphate post-treatment increased the amount of Ce(III) species from 37 at. % in Layer D to 47 at. %. The increase in Ce(III) species was due to the formation of $CePO_4$. Layer E contained a mixture of nanocrystals of cerium dioxide and hydrated cerium phosphate. The partial conversion of the CeCC into phosphate species was accompanied by a more spherical nanocrystal morphology with the nanocrystals more evenly distributed in the amorphous network. The final post-treated CeCC consisted of two layers, an inner layer composed of Mg and Al oxides and an outer layer outer layer containing cerium dioxide and hydrated cerium phosphate nanocrystals in an amorphous matrix. Layer E still contained a significant amount of $CeO_2$, but the combined presence of Mg oxide and Ce(III) oxide in Layer E decreased compared to layer D.

Figure 7A:
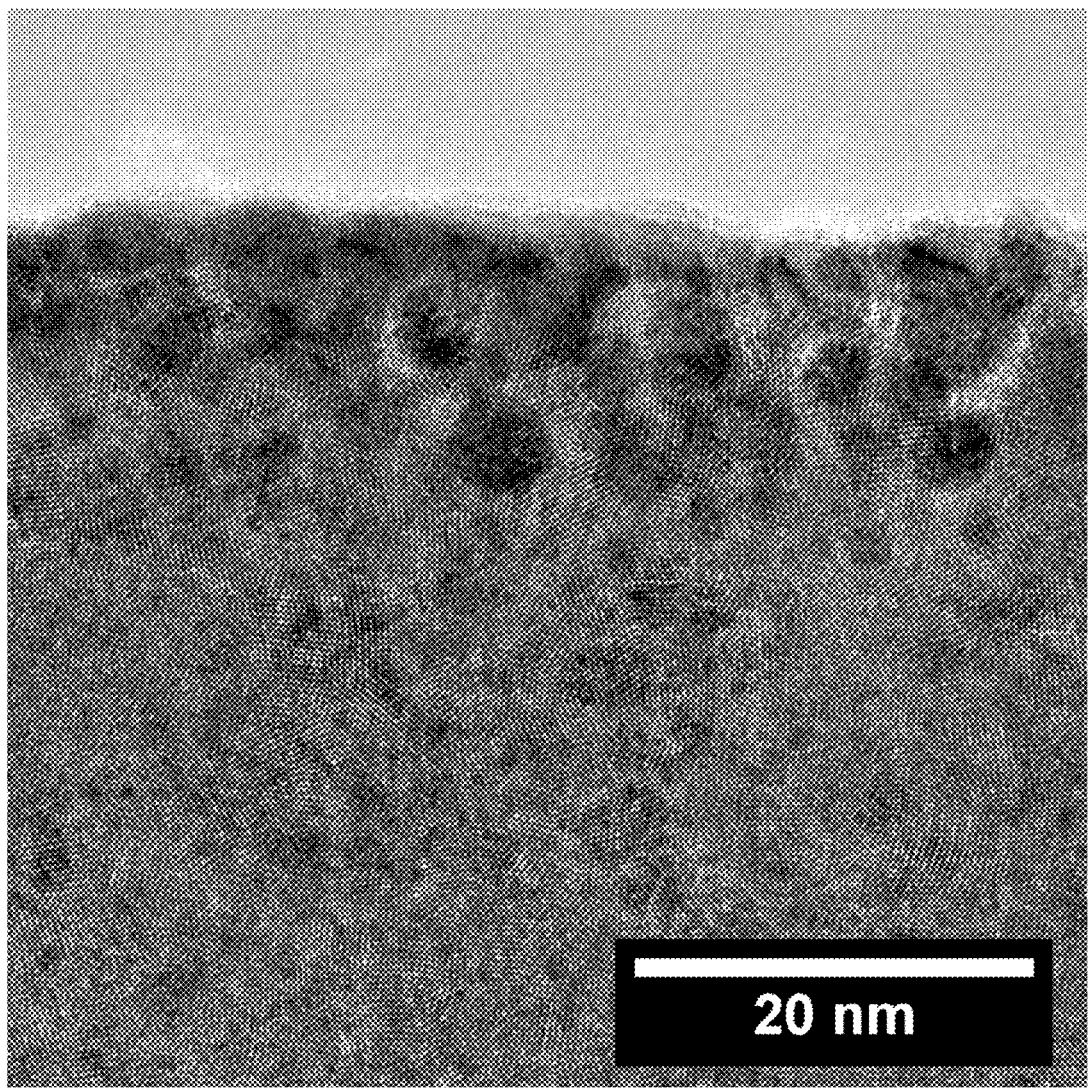
FIGS. 7A and 7C show top views of a deposited composition, according to one embodiment of the disclosure.
Figure 7B:
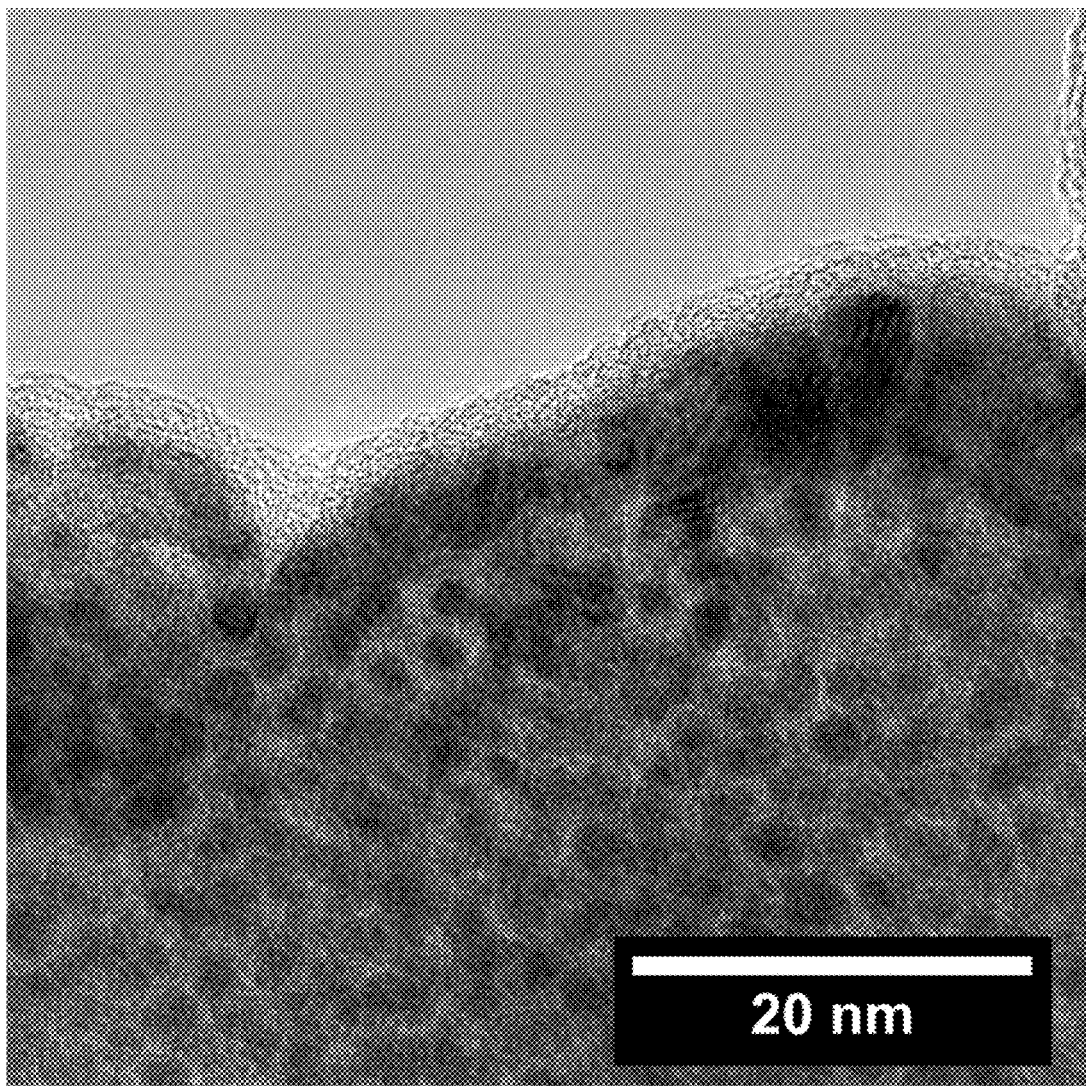
FIGS. 7B and 7D show top views of a post-treated composition, according to one embodiment of the disclosure.
Figure 7C:
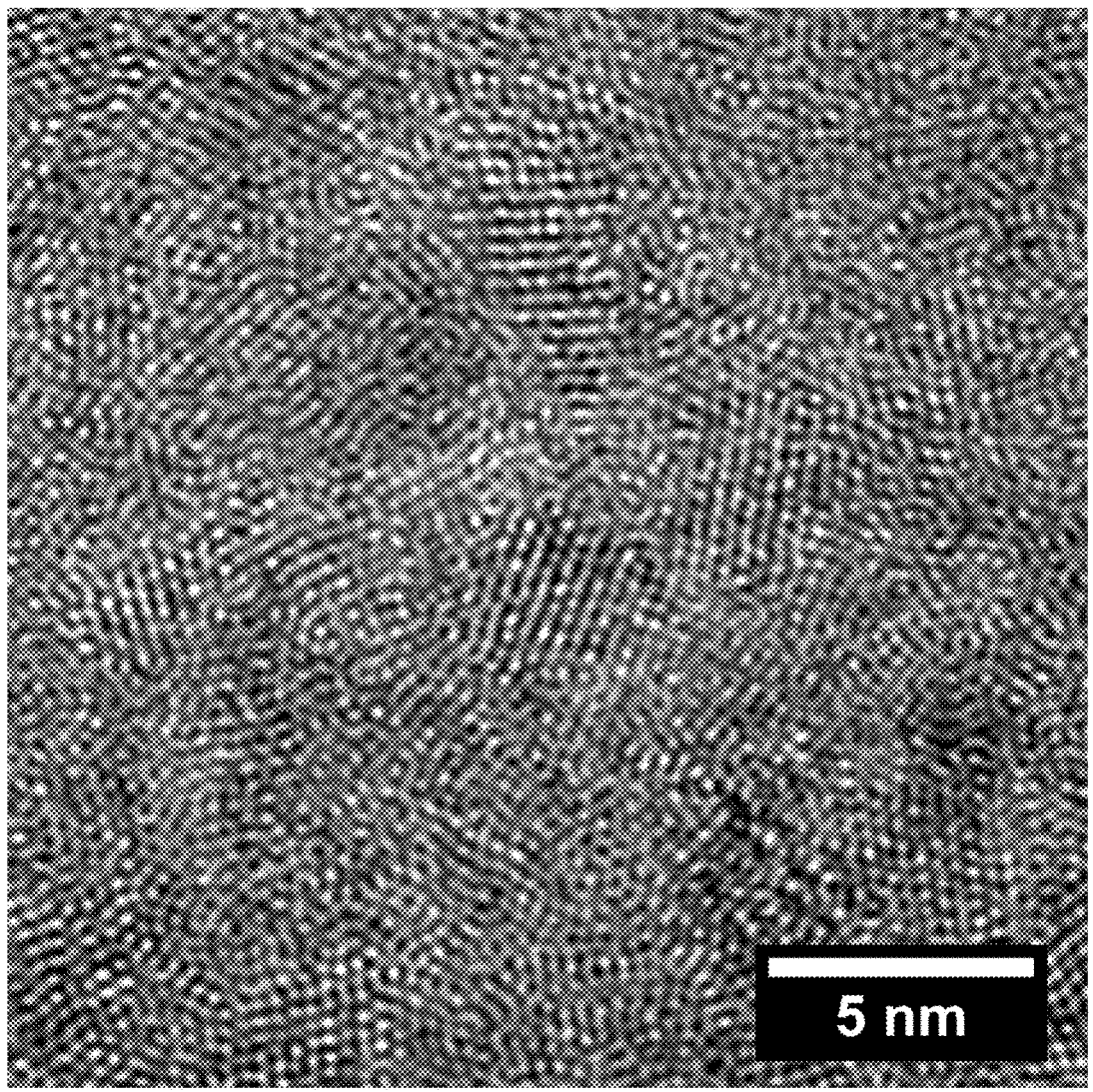
Figure 7D:
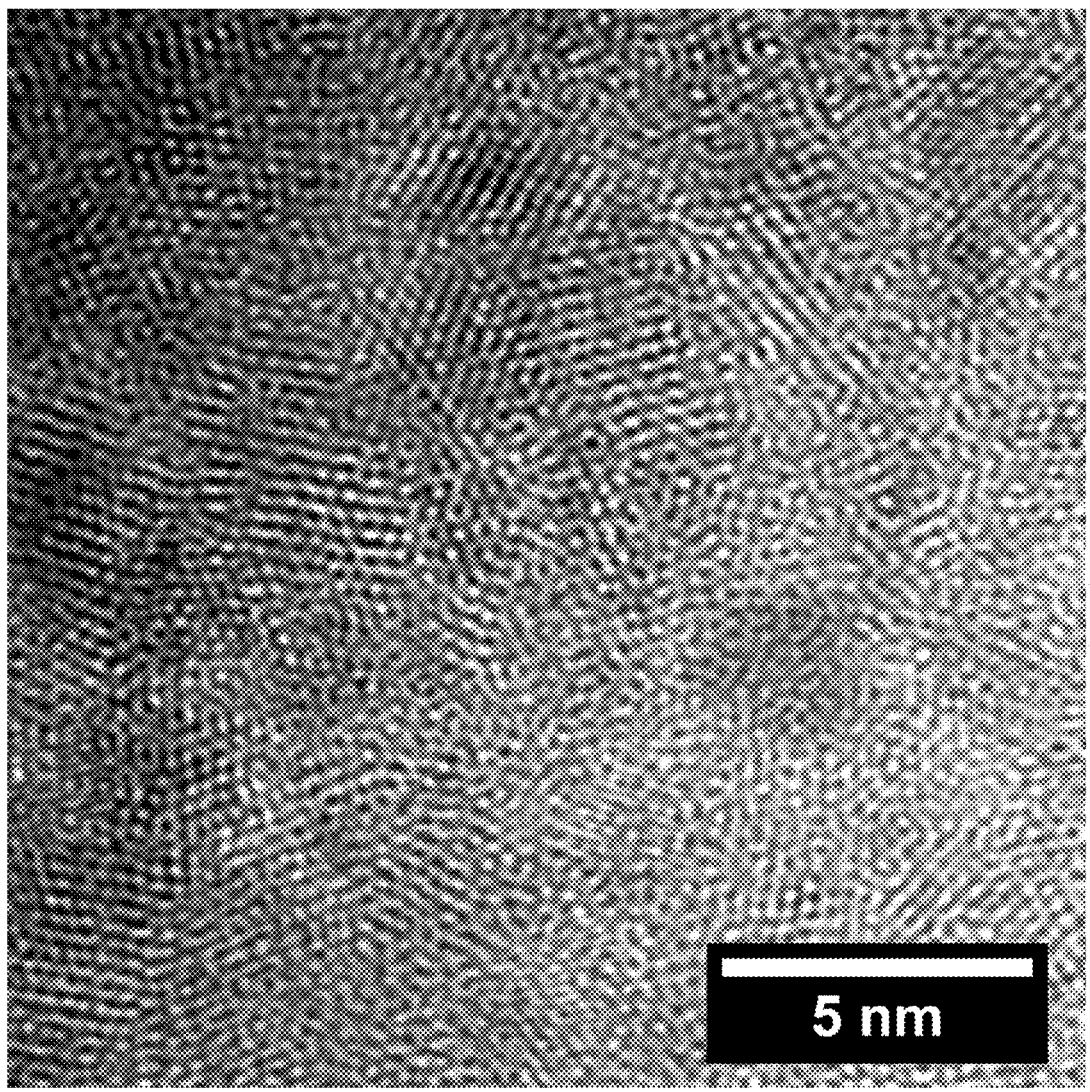

The nanocrystalline structure of the as-deposited CeCC layer D are shown in FIGS. 7A and 7C and the post-treated CeCC layer E in FIGS. 7B and 7D. The structures of layers D and E were characterized by nodular nanocrystals embedded within an amorphous matrix. Lattice imaging of the current structures show electron diffraction patterns consisting of continuous rings with diffuse halos. In addition, most of the crystalline regions were less than 5 nm in diameter for both coatings. However, the crystalline regions appeared to be more spherical and homogeneously distributed in the post-treated CeCC as shown in FIGS. 7B and 7C the lattice fringes of layer D were measured giving an approximate d-spacing of 0.32 nm, which is consistent with the {111} planes of the cubic structure of $CeO_2$. FIG. 7D corresponding to layer E shows a smaller d-spacing about 0.28 nm in some of the nanocrystals, which is consistent with the {102} facets of the hexagonal structure of $CePO_4.H_2O$. However, some nanocrystals shown in FIG. 7D also exhibited the 0.32 nm d-spacing suggesting that $CeO_2$ crystals were still present in the CeCC after post-treatment.

Figure 8:
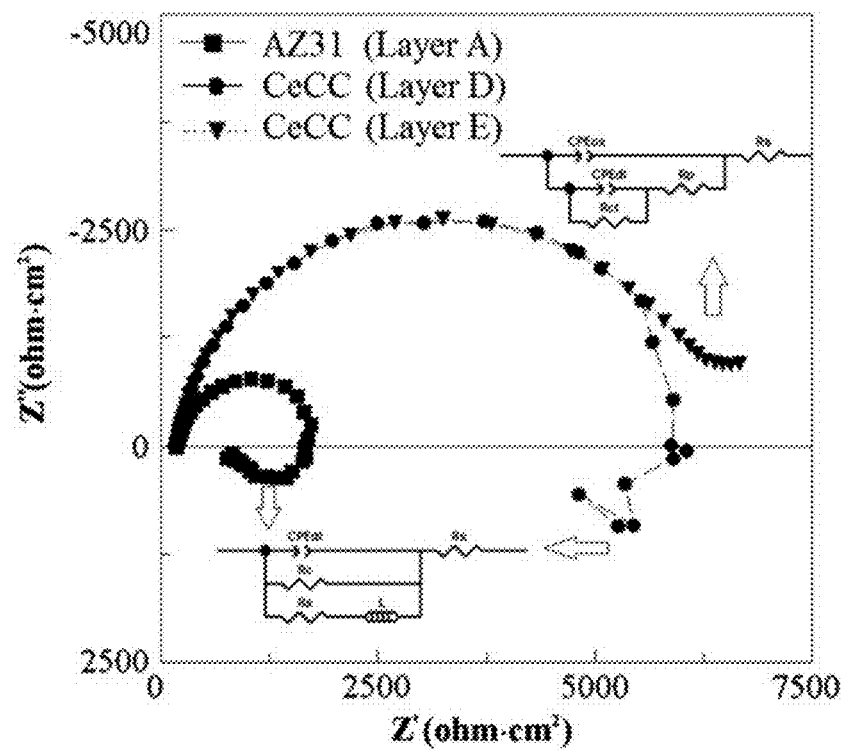
FIG. 8 shows electrochemical impedance spectra for a substrate and composition deposited on the substrate at several stages of deposition, according to one embodiment of the disclosure.

FIG. 8 shows the electrochemical impedance spectra of AZ31 Mg alloy specimen after grinding step A, as-deposited CeCC step D, and post-treated CeCC step E after 4 hours at open circuit potential (OCP) in 0.05 M NaCl electrolyte. The AZ31 Mg alloy after grinding step A shows a capacitive loop at high and medium frequencies and an inductive loop at low frequencies characteristic of bare Mg alloys. The impedance related to the capacitive loop of layers D and E exhibited an increase of about 4× with respect to the uncoated samples which is consistent with the protective behavior for CeCCs on AZ31Mg alloys. However, at low frequencies layers D and E showed different behavior. Layer D had a small inductive loop inferring that active species penetrated through the coating defects while layer E showed another capacitive loop suggesting a higher resistance surface coating. The difference in corrosion protection of layer E might be related to the reduced number of cracks after phosphate post-treatment.

Example 2: Photochemical Reduction of Nano Structured Ce(IV) to Ce(III)

A CeCC surface was prepared on a substrate as described in Example 1, and next exposed to sunlight under ambient conditions. Exposure to ambient sunlight was performed by covering half of a coated panel with aluminum foil. The partially covered CeCCs were exposed for 18 hours, in 6 hour intervals over the course of 3 consecutive days, to direct sunlight at a temperature of about 25±5° C. and a relative humidity >65%.

X-ray photoelectron spectra were collected with a Kratos Axis 165 X-ray photoelectron spectrometer (XPS) using a non-monochromated aluminum X-ray source. A Varian Cary 5 ultraviolet-visible near infrared spectrometer (UV-vis-NIR) in the wavelength range of 310-700 nm was used to record UV-vis diffuse reflectance spectra and determine optical bandgaps, $E_g$, of the coatings. Surface morphology analysis was performed using a Dual Beam Helios NanoLab 600 in scanning electron microscopy (SEM) mode. The coatings were about 400 nm thick as measured by cross-sectional analysis in focused ion beam (FIB) mode.

The as-deposited color of the CeCC changed from yellow to translucent during sunlight exposure. XPS analysis of the high resolution Ce 3d core level spectra revealed that the cerium-based nanocoatings contained a mixture of Ce(III) and Ce(IV) species with and without sunlight exposure. The Ce 3d core level spectrum is refined for the spin-orbit splitting $3d_{5/2}$ and $3d_{3/2}$ states. In addition, the $3d_{5/2}$ and $3d_{3/2}$ states are represented for 5 peaks each indexed as v(index) and u(index), respectively. The initial state of Ce(III) ($3d_{10}4f_1$) is related to the v0, u0, v', and u' final states and the initial state of Ce(IV) ($3d_{10}4f_0$) is related to the v, u, v", u", v''', and u''' final states. The concentration of Ce(III) species calculated from fitting of the spectra increased from 44 at. % in unexposed coatings to 57 at. % after sunlight exposure. These results are in agreement with the visual observations, since the Ce(IV) species are related with the yellow appearance of the unexposed coatings.

Figure 9:
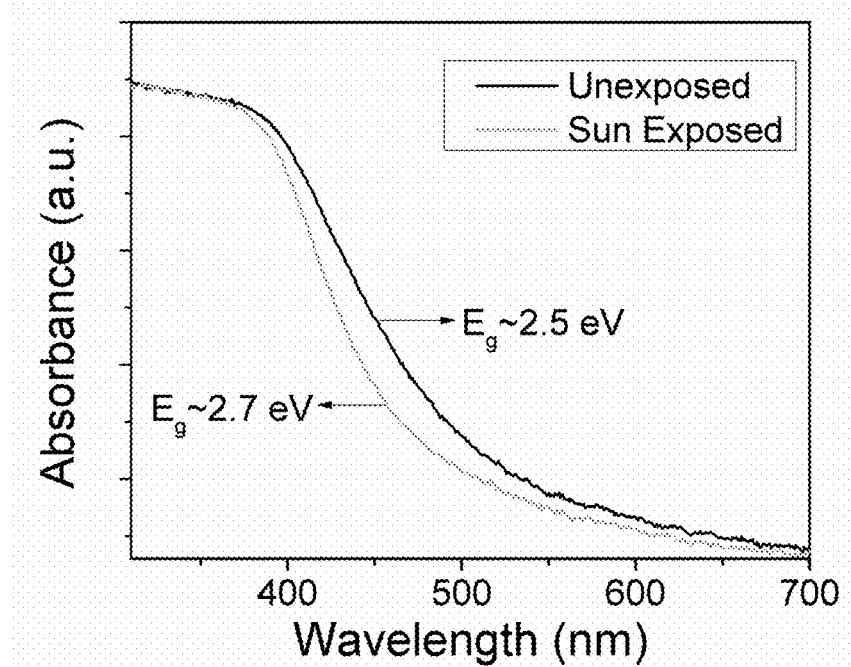
FIG. 9 shows a UV-visible spectra of a composition with and without sunlight exposure, according to one embodiment of the disclosure.

FIG. 9 shows the UV-visible spectra of the CeCCs on AZ31B substrates with and without sunlight exposure. The optical absorption edge of the part of the panel exposed to sunlight shifted to shorter wavelengths with respect to the unexposed part of the panel. The cerium-based coatings partially absorb light in the visible region as the unexposed panel absorbs at $\lambda$<490 nm and the exposed panel absorbs at $\lambda$<460 nm. The estimated band gaps are 2.5 eV and 2.7 eV for the unexposed and exposed panels, respectively. The absorbance of the unexposed sample is consistently higher than the exposed sample across the visible range of about 400 nm to about 700 nm.

Figure 10A:
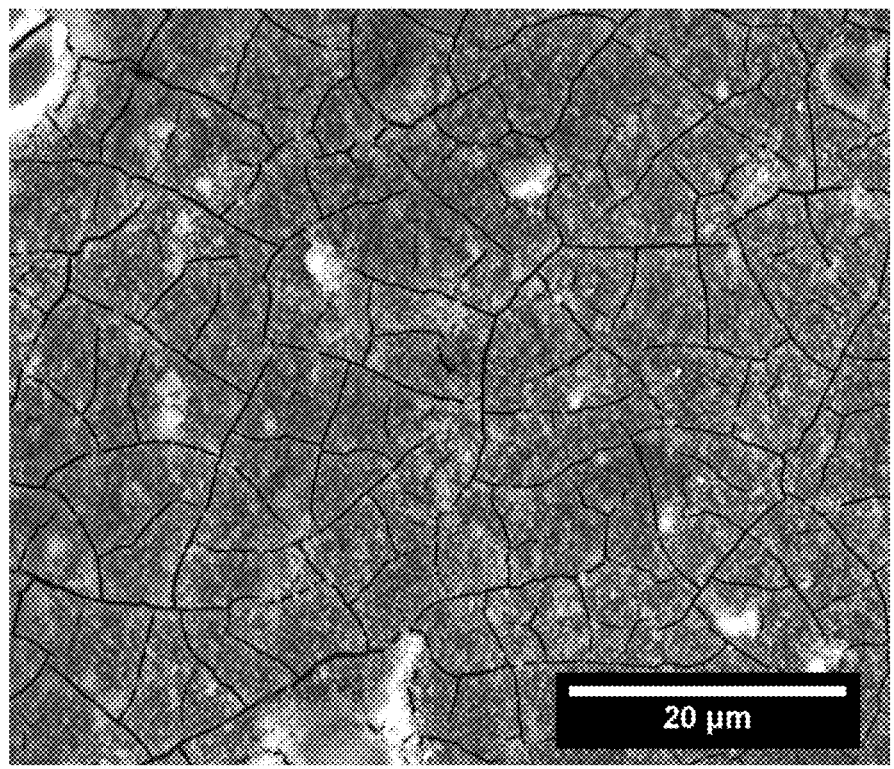
FIG. 10A shows a top view of a surface of a composition without exposure to sunlight, according to one embodiment of the disclosure.
Figure 10B:
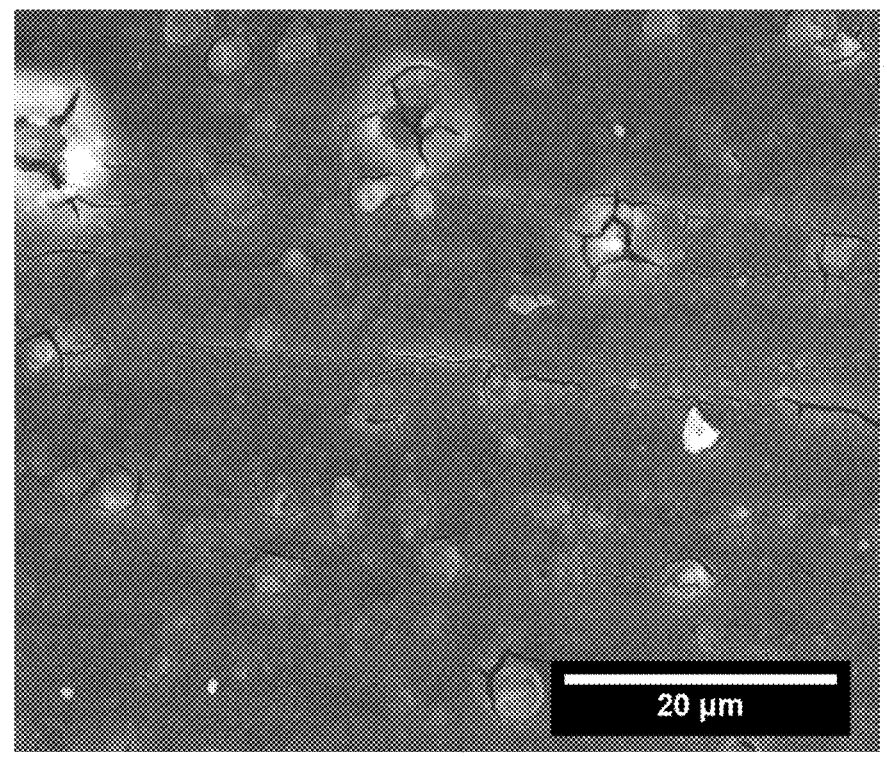
FIG. 10B shows a top view of the surface of the composition with exposure to sunlight, according to one embodiment of the disclosure.

The morphologies of the CeCCs on AZ31B Mg alloy before and after 18 hours of ambient exposure are shown in FIGS. 10A-B, respectively. The morphology of the CeCC without sunlight exposure shown in FIG. 10A exhibited a uniform mud-cracked surface morphology with small nodular agglomerates, similar to some CeCCs known in the art. FIG. 10B shows the CeCC surface morphology after being exposed to sunlight as having significantly decreased cracking compared to the unexposed sample. In addition, fewer and smaller nodules were observed in the sunlight-exposed sample.

A visible change in color was observed within the first hour of sunlight exposure and the color continued to change until panels that originally had a pale yellow color had change to translucent after about 18 hours of exposure. These observations suggest that photo-assisted reduction of Ce(IV) into Ce(III) species increased as a function of exposure time. The XPS results showed an increase of about 30% in Ce(III) species with sunlight exposure. The changes were mainly detected for the increase of the v', v0, u', and u0 final state peaks, which are related to the tightly bound Ce(III) electrons in the 4f orbital.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrase "one or more" is readily understood by one of skill in the art, particularly when read in context of its usage. For example, one or more channels on a microchip can refer to about 1 to about 100 channels, or about 100 to about 1000 channels.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values, e.g., weight percentages, proximate to the recited range that are equivalent in terms of the functionality of the individual ingredient, the composition, or the embodiment. The term about can also modify the end-points of a recited range as discuss above in this paragraph.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a nonlimiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

What is claimed is:

1. A cerium-containing nano-coating composition, the composition comprising:
    an amorphous matrix including one or more of cerium oxide, cerium hydroxide, and cerium phosphate; and
    crystalline regions including one or more of crystalline cerium oxide, crystalline cerium hydroxide, and crystalline cerium phosphate;
    wherein the crystalline regions are embedded in the amorphous matrix, wherein the thickness of the amorphous matrix with embedded crystalline regions is at least 100 nanometers and the diameter of each crystalline region is less than 50 nanometers.

2. The composition of claim 1, wherein cerium is present as both trivalent cerium (Ce(III)) and tetravalent cerium (Ce(IV)).

3. The composition of claim 2, wherein the ratio of the Ce(III) species to the Ce(IV) species is between 0.1 to 1.0.

4. The composition of claim 2, wherein the Ce(IV) species and Ce(III) species comprise a reversible redox couple.

5. The composition of claim 4, wherein the Ce(IV)/Ce(III) redox couple is reversible at constant environmental conditions.

6. The composition of claim 2, wherein Ce(III) content is increasable by up to 33 atomic percent via photocatalytic reduction of Ce(IV) species at ambient conditions.

7. The composition of claim 1, wherein the composition is capable of self-healing surface cracks.

8. The composition of claim 1, wherein an achievable band gap differential is 2.0 eV to 4.0 eV.

9. The composition of claim 8, wherein the band gap is increasable by exposing the composition to sunlight at ambient temperatures and pressures.

10. The composition of claim 1, wherein the composition is capable of absorbing light having a range of threshold absorption wavelengths up to 590 nanometers.

11. The composition of claim 1, wherein the composition is capable of photocatalytically splitting water at ambient temperatures and pressures.

12. The composition of claim 1, wherein the embedded crystalline regions are homogenously distributed in the amorphous matrix.

* * * * *